United States Patent [19]

Sugalski

[11] Patent Number: 4,529,675
[45] Date of Patent: Jul. 16, 1985

[54] RECHARGEABLE ELECTROCHEMICAL CELL HAVING IMPROVED CURRENT COLLECTOR MEANS

[75] Inventor: Raymond K. Sugalski, Gainesville, Fla.

[73] Assignee: General Electric Company, Gainesville, Fla.

[21] Appl. No.: 673,643

[22] Filed: Nov. 21, 1984

[51] Int. Cl.³ .............................................. H01M 2/20
[52] U.S. Cl. ...................................... 429/94; 429/122
[58] Field of Search .......................... 429/94, 122, 178

[56] References Cited

U.S. PATENT DOCUMENTS

| | | | |
|---|---|---|---|
| 3,732,124 | 5/1973 | Cailley | 429/94 |
| 3,790,408 | 2/1974 | Cromer | 429/94 |
| 4,009,053 | 2/1977 | Schenk et al. | 429/94 |
| 4,053,687 | 10/1977 | Coibion et al. | 429/94 |
| 4,322,484 | 3/1982 | Sugalski | 429/94 |
| 4,332,867 | 6/1982 | Tsuda et al. | 429/94 |

Primary Examiner—Anthony Skapars
Attorney, Agent, or Firm—Henry J. Policinski

[57] ABSTRACT

A rechargeable electrochemical cell is provided having an improved current collector which provides an electrical path from one of the cell electrodes to a terminal external to the cell. The collector is provided with resilient deflectable tabs which reside in the cell in a deflected state between the electrode and the container and which exert a contact force establishing electrically conductive contact between a spiral edge segment of the electrode and a contact edge on the tab.

3 Claims, 3 Drawing Figures

U.S. Patent    Jul. 16, 1985    4,529,675
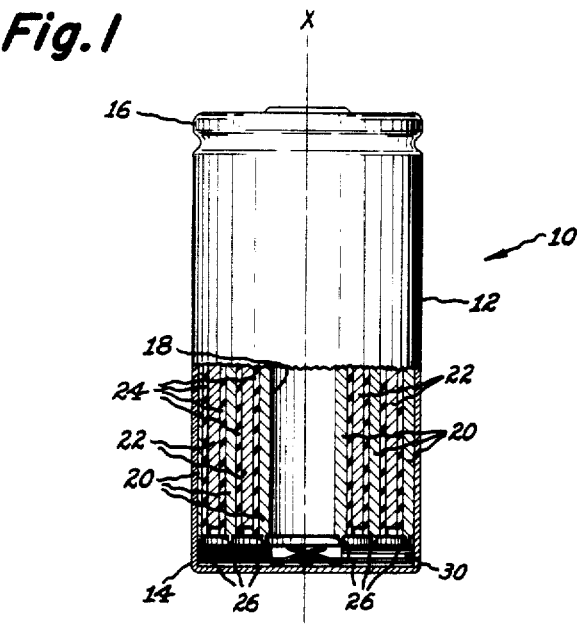
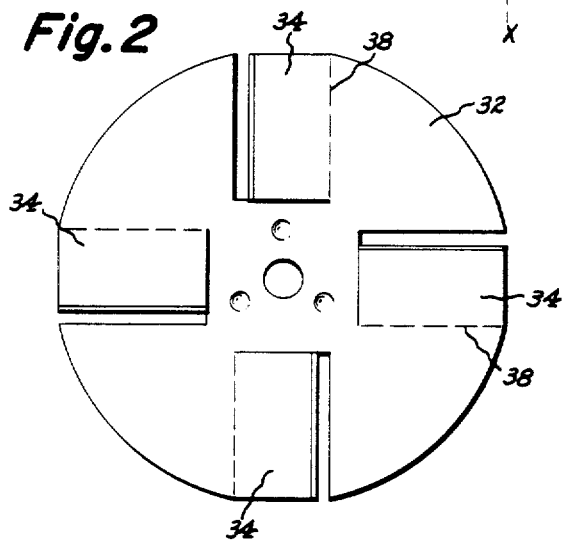
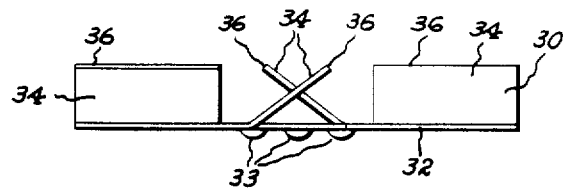

RECHARGEABLE ELECTROCHEMICAL CELL HAVING IMPROVED CURRENT COLLECTOR MEANS

BACKGROUND OF THE INVENTION

This invention relates to a rechargeable electrochemical cell and more particularly to a rechargeable electrochemical cell having improved means for providing an electrical connection between one of the electrodes in the cell and the container in which the cell electrode assembly resides.

In rechargeable electrochemical cells, such as nickel-cadmium cells, it is necessary to establish an electrical connection between the external terminals of the cell and the electrodes contained within the cell. In some cell designs, the cell container functions as one of the external terminals of the cell and accordingly electrical connection must be provided between the container and one of the electrodes within the cell. Establishing an effective reliable connection is considerably important since the rate of discharge of electrical energy the cell is directly dependent upon the integrity of the connection.

The connection between the container and the electrode serves two functions. First, the connection must act as a collector of current from the electrode to which it is connected and, second, the connection must function to deliver the current to the cell container. If either of these functions are not adequately performed the cell will exhibit a high resistance to the passage of current and attendant low discharge rates and low output voltages.

In the prior art, many different approaches have been pursued in attempts to provide suitable current collectors. In one such approach, of which U.S. Pat. Nos. 3,508,806, 3,732,124, and 4,452,869 are typical, a current collector is inserted into the cell container between the spirally wound electrode assembly and the bottom of the container. The electrode assembly is comprised of positive and negative electrodes which are axially offset with respect to each other so that the edge of only one electrode may be contacted by one current collector. The current collector is provided with one or more rigid projections adapted to engage the axially offset edge of the electrode. The rigid projections are welded to the offset edge of the electrode and hence are adapted to collect current from the cell electrode. In order to deliver the collected current to the cell container, the current collector may be provided with an integrally formed strap which may be welded to the bottom of the cell container.

The approach described in the aforementioned patents has been commonly termed the edge-welded approach since the rigid projections of the current collector are welded to the offset edge of one of the cell electrodes. Use of a welding procedure to effect electrical contact between the rigid projections of the current collector and the electrode is not entirely suitable in a high volume production line. Welding of the rigid projections of the collector to the electrode time consuming and costly. Furthermore, subsequent welding of the collector to the cell container after insertion of the electrode assembly into the container is cumbersome and may result in an undetected partial or totally incomplete weld.

In an attempt to overcome some of these manufacturing and assembly problems, one approach has eliminated the weld operation affixing the strap of the collector to the cell container. Instead, electrical contact has been achieved by folding the aforementioned strap between the outer cylindrical surface of the electrode assembly and the inner cylindrical surface of the cell container as exemplified by U.S. Pat. No. 4,452,869. However, under high rate production conditions proper folding of the strap may not always occur and sufficient electrical connection may not be achieved. In another attempt to overcome the aforementioned difficulties, U.S. Pat. No. 4,009,053 suggests that, while welding is preferred, the connection of the rigid projections of the current collector to the electrode may be accomplished by pressure. However, with variations in cell component dimensions, even variations well within normal and acceptable tolerances, pressure contact between the rigid projections of the current collector and the edge of the electrode may not always be assured under conditions of high rate manufacture. Furthermore, vibration or impact forces upon the cell during its useful life may shift the electrode assembly within the container whereby the electrical contact is broken between the rigid projections of the current collector and the electrode. The present invention addresses these problems and difficulties in a new and novel manner.

It is therefore an object of the present invention to provide a rechargeable electrochemical cell having an improved current collector for providing an electrical path from one of the cell electrodes to one of the external terminals of the cell.

It is another object of the present invention to provide a rechargeable electrochemical cell having a current collector which achieves sustained electrical contact with the cell electrode without welding of the collector to the edge of the electrode.

It is yet another object of the present invention to provide a rechargeable electrochemical cell having a current collector which is welded to the cell container prior to insertion of the electrode assembly into the cell container.

It is still another object of the present invention to provide a rechargeable electrochemical cell having a current collector configuration which will reliably and invariably establish a sufficient electrical path between the cell electrode and the external terminal of the cell even under conditions associated with high rate manufacturing assembly production lines and under conditions wherein the cell may be subjected to severe impact or vibration.

SUMMARY OF THE PRESENT INVENTION

Briefly stated, these and other objects of the present invention which will become apparent from the following detailed description and accompanying drawings, are accomplished by the present invention which, in one form, provides a rechargeable electrochemical cell having a sealed cylindrical container with an electrode assembly disposed therein and spirally wound about an axis. The assembly includes first and second electrodes with a separator disposed therebetween. The electrodes of the assembly are offset axially from each other so that the first electrode has an offset segment extending, at a first end of the container, in a first axial direction axially beyond the second electrode. Electrolyte infiltrates both electrodes and the separator residing in the cell container. The cell is provided with a current collector residing within the container adjacent the axially offset segment of the first electrode. The current collector includes a base portion spaced from the offset segment of the electrode and in electrical contact with the cell container. The current collector further includes a plurality of deflectable tabs each extending from the base portion and into electrical contact with the offset edge segment of the electrode at a plurality of locations along the segment. Accordingly, electrical current passes from the offset segment of the electrode to the tabs and thence to the base portion of the collector and finally to the cell container. When residing in the sealed cell the tabs of the collector are disposed in a deflected condition or state to exert a contact force on the offset edge segment and thereby effect electrical contact between the tabs and the electrode. Since the projecting tabs are deflectable, rather than rigid, variations in cell component dimensions will be accommodated.

DESCRIPTION OF DRAWINGS

While the specification concludes with claims particularly pointing out and distinctly claiming the present invention, the invention will be more readily understood from the following description of the preferred embodiment which are given by way of example with the accompanying drawings in which:

FIG. 1 schematically depicts an electrochemical cell shown partially in cross-section and containing the current collector comprising the prevent invention.

FIG. 2 is an enlarged top view of the current collector shown in FIG. 1.

FIG. 3 is side view of the current collector shown in FIG. 2.

DESCRIPTION OF THE PREFERRED EMBODIMENT

Referring now to FIG. 1, a schematic view of an electrochemical cell, designated generally at 10, is depicted partly in cross-section and is shown with the current collector of the present invention illustrated, for purposes of clarity, in a side view. Electrochemical cell 10 is comprised of a cylindrical sealed container 12 having first and second ends 14 and 16, respectively. Residing within container 12, generally cylindrical electrode assembly 18 spirally wound about axis x—x is conventionally comprised of a first electrode 20, a second electrode 22 and a separator 24 sandwiched between electrodes 20 and 22. An electrolyte, for example potassium hydroxide, is provided within cell container 12 and infiltrates electrodes 20 and 22 and separator 24. First electrode 20, which may be the negative electrode of the cell, is offset along axis x—x from second electrode 22 which may be comprised of the positive electrode of the cell. More specifically, electrode 20 is displaced along axis x—x in a direction toward end 14 of container 12 while electrode 22 is displaced along the x—x axis in a direction toward end 16 of container 12. Offset in this manner, the electrode 20 includes a sprially wound offset edge segment 26 extending in the direction of end 14 beyond electrode 22. Electrode 20 is offset from electrode 22 to permit the current collector to contact the electrode 20 while avoiding contact between the collector and the electrode 22. As depicted in FIG. 1, offset segment 26 of electrode 20 is comprised of the electrically conductive substrate portion of the electrode 20 in order to assure better electrical contact with the current collector.

Current collector means in the form of current collector disc 30, having an outer diameter substantially approximating the outer diameter of cylindrical electrode assembly 18, is disposed in container 12 axially adjacent offset edge segment 26 and in abutting electrically conductive engagement with container 12. As will hereinafter be explained, current collector 30 includes resilient deflectable means, in engagement with the offset segment 26 of electrode 20, which exerts a contacting force on offset segment 26 to establish electrically conductive contact therewith.

Referring now to FIGS. 2 and 3, the current collector disc 30 will now be described in detail. Current collector disc 30 inclues a generally planar thin circular base portion 32 having a diameter approximating the outer diameter of electrode assembly 18. Accordingly, as will later be described, current collector disc 30 will collect current from spirally wound edge segment 26 not only at the inner turns of the spiral but also at the outer turns of the spiralled segment 26 proximate the outer diameter of assembly 18. Planar base portion 32 is provided with a series of weld bosses 33 on one side thereof to assist in welding the collector 30 to the bottom of container 12. While welding of collector 30 to cell container 12 is preferred, welding is not necessary to achieve the benefits of the present invention. Alternatively, electrical contact may be achieved through the use of abutting engagement of collector 30 and container 12. If welding of the current collector 30 to container 26, is effected the welding operation is performed after the collector 30 is inserted into the container 26 but before electrode assembly 18 is inserted into container 26. Welding prior to insertion of the assembly 18 into container 26, provides sufficient space within the container for insertion of the welding electrodes and for inspecting the integrity of the weld.

Current collector disc 30 includes a plurality of resilient deflectable spring tabs 34 integrally connected to base portion 32 and projecting from one side of base portion 32 at a non-normal angle; that is, an angle not perpendicular to the plane of planar base portion 32. Since tabs 34 project at a non-normal angle, tabs 34 are readily deflectable for purposes hereinafter to be explained. Tabs 34 are preferably constructed by stamping a portion of planar base portion 32 out of its plane and permanently bending the tabs 32 to project from base portion 32 at the aforementioned non-normal angle. Constructing of current collector 30 from spring steel, enables each tab 34 to function as individual leaf springs deflectable toward and away from planar base portion 32.

Current collector 30 is positioned within container 12 so that base portion 32 is spaced apart from edge-segment 26 with tabs 34 projecting toward and into engagement with edge segment 26. With electrode assembly 18 residing within cell container 12, the axial spacing between the offset edge segment 26 of electrode 20 and the base portion 32 is less than free undeflected height of tabs 34 such that tabs 34 are each disposed in a deflected condition or state and therefore exert a contact force upon offset edge segment 26 at a plurality of locations to establish electrically conductive contacts therewith.

Each tab 34 projects away from base portion 32 and terminates at a contact edge 36 which engages the spiral edge segment 26 of electrode 20. Each edge 36 extends in a direction parallel with the bend line 38 at which tab 34 is joined to base portion 32 and about which the tab 34 pivots when deflected. Constructing tab 34 in this manner assures that edge 36 will not only remain parallel with base portion 32 for all deflected positions of tab 34 but also will exert an equal force at each of the plurality of contact locations between edge 36 and offset segment 26.

It has also been found very desireable to arrange the plurality of tabs 34 in an opposed pair relationship. More specifically, it is observed from FIG. 2 that the plurality of tabs 34 include a pair of tabs 34 disposed at locations dispaced angularly from each other along the plane of the base portion 32 by approximately 180 degrees. More specifically, the location at which one of the tabs 34 is joined to base portion 32 is displaced along the plane of base portion 32, 180 degrees from the location at which another tab 34 is joined to the base portion 32. Furthermore, the tabs 34 in this pair are constructed to project in opposite directions; that is to say, the tab 34 in the upper portion of FIG. 2 projects to the left while the tab 34 in the lower portion of FIG. 2 projects to the right. With tabs 34 arranged in this opposed pair relationship, deflection of the pair of tabs will not result in substantial torque on collector disc 30 stressing the weldments between weld bosses 33 and container 12 when tabs 34 are in a deflected condition or state within container 12.

It is observed from the figures that the present invention provides tabs 34 which are equally spaced about the circumferential extent of the circular base portions 32 and which extend radially outward from the general center of the disc 30 to its outer diameter. Accordingly, the contact edge 36 of each tab 34 will overlap a plurality of turns in the spiral edge segment 26 of electrode 20. It is thus assured that electrically conductive contact between offset edge segment 26 and a pair of edges 36 will be achieved at a plurality of locations across the entire diameter of electrode assembly 18. Multiple contacts across the entire diameter of electrode assembly 18 provide a plurality of electrical paths for collecting the electrical current from electrode 20 thereby reducing the internal resistance of the cell and enhancing the rate at which electrical energy may be discharged from the cell.

As stated above, deflectable tabs 34 of current collector 30 are in a deflected state or condition in sealed container 32. Deflection of tabs 34, is achieved when electrode assembly 18 is inserted into container 12. More specifically, electrode assembly 18 is inserted into the container 12 to a depth whereby the spacing between segment 26 and base portion 32 is less than the free undeflected height or distance of edges 36 of tabs 34. Accordingly insertion of assembly 18 into container 12, deflects edges 36 toward base portion 32. Since tabs 34 are comprised of spring steel, deflection and compression of tabs 34 will result in a reaction force whereby the edge 36 of each tab 34 exerts a contact force on edge segment 26 to establish abutting electrically conductive engagement of edges 26 with spiral edge segment 26 of electrode 20. The spring rate of tabs 34 and free height of edges 36 are selected so that effective deformation of tabs 34 will be achieved for any combination of tolerance stack-up of the cell components. Thus edges 36 of tabs 34 will be in pressure engagement with segment 26 regardless of dimensional variations exhibited by the component parts. This feature is achieved by the present invention through the use of resilient, deflectable projecting tabs 34 rather than the rigid projections found in the prior art.

While the preferred embodiment of the present invention has been described and depicted, it will be appreciated by those skilled in the art that modifications, substantiations and changes may be made thereto without departing from the scope of the invention as set forth in the appended claims.

I claim:

1. A rechargeable electrochemical cell comprising:
   a sealed cylindrical container having first and second ends;
   an electrode assembly disposed in said container and spirally wound about an axis, said assembly comprising first and second electrodes with a separator disposed therebetween, said first electrode having an offset edge segment extending at said first end in a first axial direction axially beyond said second electrode;
   an electrolyte disposed within said container and infiltrating said first and second electrodes and said separator;
   a current collector disposed in said container axially adjacent said offset segment of said first electrode, said collector having a base portion spaced from said offset segment and in electrically conductive contact with said container, said collector further having a plurality of deflectable tabs each projecting from said base portion and into electrical contact with said offset segment at a plurality of locations along said offset segment, said tabs being in a deflected condition to exert a contact force on said offset segment and thereby effect electrical conductive engagement between said tabs and said offset segment at each of said locations.

2. A rechargeable electrochemical cell comprising:
   a sealed cylindrical container having first and second ends;
   an electrode assembly disposed in said container and spirally wound about an axis, said assembly having a generally cylindrical configuration with an outer diameter and comprising first and second electrodes with a separator therebetween, said first electrode having an offset segment extending at said first end in a first axial direction axially beyond said second electrode;
   an electrolyte disposed within said container and infiltrating said first and second electrodes and said separator;
   a current collector disc having an outer diameter substantially approximating said outer diameter of said electrode assembly, said disc disposed in said container axially adjacent said offset segment and in abutting electrically conductive engagement with said container, said disc having a generally planar base portion and a plurality of resilient deflectable tabs each integrally connected to and projecting from said base portion axially toward said offset segment in a direction non-normal to said planar base portion, each of said tabs terminating in a contact edge in abutting electrically conductive engagement with said offset segment, at a number of locations, said contact edge of each tab being parallel to said planar base portion for all deflected positions of said tab associated with said contact edge, said tabs being in a deflected condition when disposed within said sealed container whereby said contacting edges exert a contacting force on said offset segment to establish said electrical contact at each of said locations.

3. The invention as set forth in claim 2 wherein said plurality of tabs includes a pair of tabs, one tab in said pair joined to said disc at a first location and the other tab in said pair joined to said disc at a second location displaced angularly along the plane of said base portion by approximately 180 degrees, said one of said tabs extending from said disc in a direction opposite from the direction in which the other of said tab extends from said disc.

* * * * *